US007124655B2

(12) United States Patent
Blossfeld

(10) Patent No.: US 7,124,655 B2

(45) Date of Patent: Oct. 24, 2006

(54) TWO-WIRE SENSOR FOR MEASURING A PHYSICAL PARAMETER

(75) Inventor: Lothar Blossfeld, Breitnau (DE)

(73) Assignee: Micronas GmbH, Freiburg (DE)

(*) Notice: Subject to any disclaimer, the term of this patent is extended or adjusted under 35 U.S.C. 154(b) by 740 days.

(21) Appl. No.: 10/127,334

(22) Filed: Apr. 22, 2002

(65) Prior Publication Data

US 2002/0153885 A1 Oct. 24, 2002

(30) Foreign Application Priority Data

Apr. 20, 2001 (DE) ................................ 101 19 471

(51) Int. Cl.
*G01D 5/246* (2006.01)
*G08C 19/22* (2006.01)

(52) U.S. Cl. ...................................... 73/866.1; 324/200

(58) Field of Classification Search ............... 73/866.1; 324/200, 260

See application file for complete search history.

(56) References Cited

U.S. PATENT DOCUMENTS

| | | | | |
|---|---|---|---|---|
| 3,495,776 | A * | 2/1970 | O'Neill | 235/201 PF |
| 3,515,961 | A * | 6/1970 | Allen, Jr. | 318/591 |
| 4,217,572 | A | 8/1980 | Giraud | 370/204 |
| 4,412,450 | A | 11/1983 | Franz et al. | 73/304 C |
| 4,695,840 | A | 9/1987 | Darilek | 340/825.63 X |
| 4,805,465 | A * | 2/1989 | Gerrath et al. | 73/866.1 X |
| 5,268,852 | A * | 12/1993 | Forsythe et al. | 702/58 |
| 5,585,719 | A * | 12/1996 | Endo et al. | 324/235 |
| 6,008,637 | A * | 12/1999 | Corbier | 324/165 |
| 6,480,805 | B1 * | 11/2002 | Irle et al. | 702/150 |
| 6,525,531 | B1 * | 2/2003 | Forrest et al. | 324/207.2 |
| 6,687,644 | B1 | 2/2004 | Zinke et al. | 702/145 |

FOREIGN PATENT DOCUMENTS

| | | |
|---|---|---|
| DE | 2701184 | 7/1978 |
| DE | 3330904 | 3/1985 |
| DE | 3615463 | 11/1987 |
| DE | 69223640 | 10/1992 |
| DE | 19809334 | 9/1999 |
| DE | 19941465 | 3/2001 |
| EP | 0037502 | 10/1981 |
| EP | 0501771 | 9/1992 |
| WO | WO 97/08915 | 3/1997 |

OTHER PUBLICATIONS

XP-002201823, TLE 4942 Preliminary Datasheet, Jun. 2000, pp. 1-9, 11-13.

XP-002201875, TU Chlausthal, Inst., 1998 (English language translation), month not given 1 page.

* cited by examiner

*Primary Examiner*—Thomas P. Noland

(74) *Attorney, Agent, or Firm*—O'Shea, Getz & Kosakowski, P.C.

(57) ABSTRACT

To measure a physical parameter, a two-wire sensor produces pulse-width modulated signals (PWM) whose pulse width is preferably modulated as a function of the physical parameter to be measured. To indicate an error or a malfunction, the two-wire sensor provides an error signal with a specifiable pulse-width ratio that is preferably 1:1, while asymmetric pulse-width ratios are provided for the measurement signals (PWM). To measure a physical parameter that assumes only one of two states or values, the two-wire sensor produces a first measurement signal with a specifiable asymmetric pulse-width ratio and a second measurement signal formed by inversion of the first measurement signal. A plurality of two-wire sensors can for example be connected to a common two-wire line and operated in time-multiplex mode.

8 Claims, 3 Drawing Sheets

TWO-WIRE SENSOR FOR MEASURING A PHYSICAL PARAMETER

BACKGROUND OF THE INVENTION

The invention relates to the field of semiconductor sensors, and in particular to a two-wire sensor.

A two-wire sensor includes a measuring sensor that measures a physical parameter such as for example temperature, pressure, or field strength of a magnetic field, and electronic components for processing the signals delivered by the measuring sensor. Both the power supply and the conducting of the measured and processed measurement signals use only two lines, accounting for the name two-wire sensor. A two-wire sensor has only two terminals that simultaneously serve to supply current and conduct the measured and processed measurement signals.

Two-wire sensors may include contactless magnetic switches which, depending on the strength and direction of the magnetic field to be measured, provide a measurement signal whose current is indicative of field strength. The structural element is passive as seen from outside in the simplest case (the current/voltage characteristic can change in other ways as well if appropriate and its internal resistance changes). When a current is imposed, the voltage that can be tapped changes and when a voltage is impressed, the resultant current changes. Both (also in combination) can be evaluated as a signal on the receiver side. Such two-wire sensors are used for example in motor vehicles as belt buckle switches or position switches. When two-wire sensors are used in safety-relevant areas, high reliability is necessary. In particular, a defective or improperly operating two-wire sensor must be detected in a timely manner.

Therefore, there is a need for an improved two-wire sensor.

SUMMARY OF THE INVENTION

A two-wire sensor provides a pulse-width modulated output signal (PWM) whose pulse width is preferably modulated as a function of the physical parameter to be measured. To indicate an error or a malfunction, the two-wire sensor provides a specifiable pulse-width ratio that is preferably 1:1, while asymmetric pulse-width ratios are provided for the measurement signals (PWM). To measure a physical parameter that assumes only one of two states or values, the two-wire sensor produces a first measurement signal with a specifiable asymmetric pulse-width ratio and a second measurement signal formed by inversion of the first measurement signal.

A plurality of two-wire sensors can be connected to a common two-wire line and operated in time-multiplex mode and the signals produced by the two-wire sensors are pulse-width modulated.

The two-wire sensor modulates the pulse width of the measurement signals as a function of the physical parameter to be measured.

An error or an improper function of the two-wire sensor can be indicated by an error signal with a specifiable pulse width. Preferably, the pulse-width ratio of the error signal is 1:1, while measurement signals with asymmetric pulse-width ratios are selected for showing the physical parameter to be measured. Different pulse-width ratios allow more than the physical parameter to be measured to be shown. That is, other information from the two-wire sensor can be displayed by different pulse-width ratios.

In a two-wire sensor that measures a physical parameter that assumes only two values or states, one embodiment provides for displaying the first value or state by a first measurement signal with a first specifiable pulse width and the second value or the second state by a second measurement signal produced by inverting the first measurement signal.

When the error signal exhibits the symmetrical pulse-width ratio of 1:1, inversion does not change the pulse-width ratio. Therefore, for example, changes in a magnetic field that inverts the signal have no effect on the error signal. If the two-wire sensor is defective or the leads are interchanged or a line to the two-wire sensor is broken or short-circuited, the sensor does not deliver any pulse-width modulated signals.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
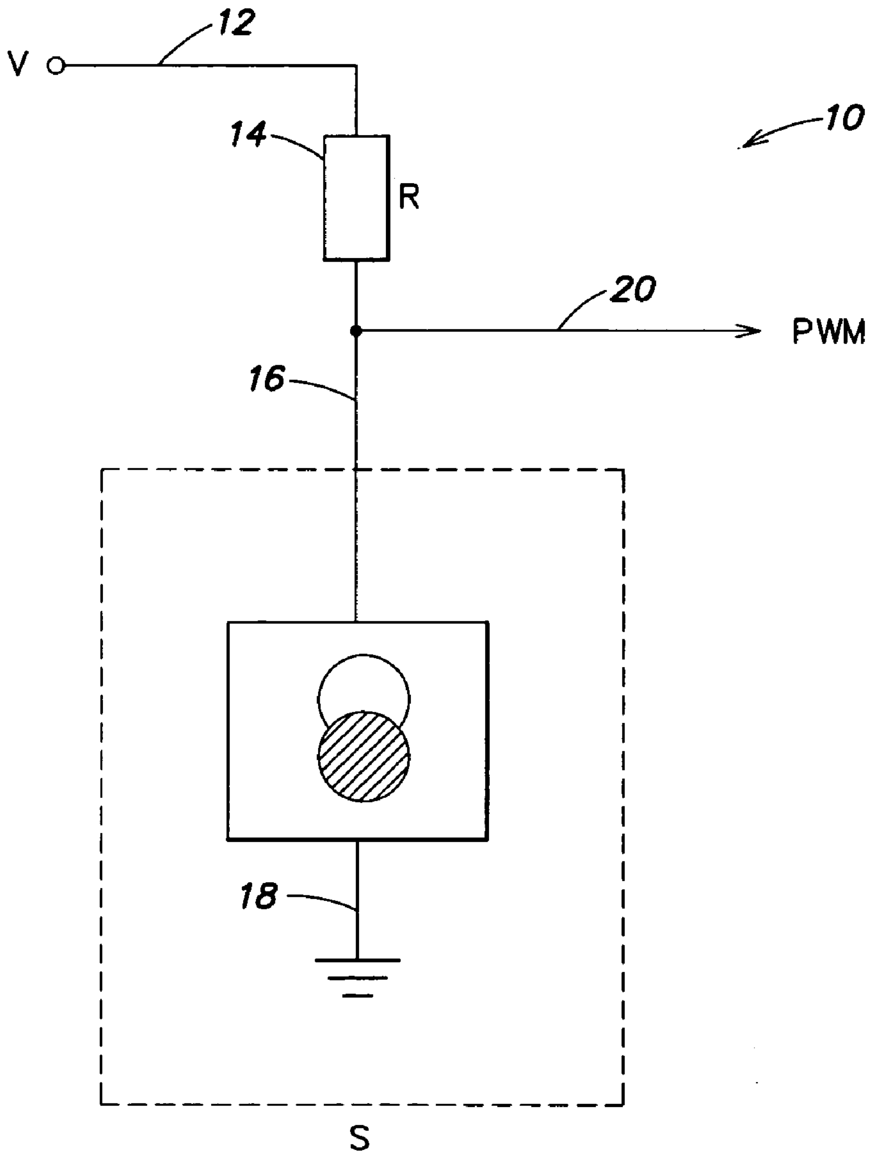
FIG. 1 illustrates a two-wire sensor.

FIG. 1 is a block diagram illustration of a two-wire sensor 10, which is connected to a voltage signal V on a line 12 through a resistor 14. A first lead 16 of the two-wire sensor 10 is connected to the resistor 14, and a second lead 18 of the two-wire sensor is connected to ground potential 20. The two-wire sensor outputs a pulse-width modulated signal (PWM) onto a line 20 via the first lead 16.

Figure 2:
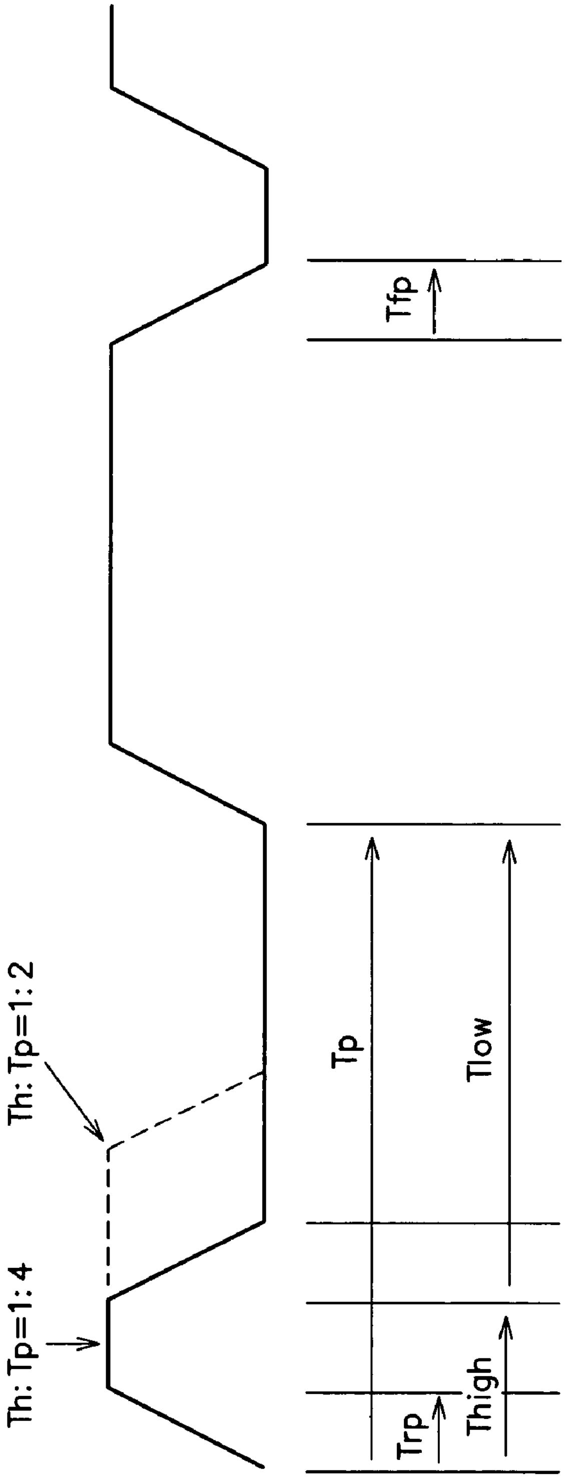
FIG. 2 is a plot of a pulse-width modulated signal that is output from the two-wire sensor of FIG. 1 as a function of time.

FIG. 2 is a plot of a pulse-width modulated signal that is output on the line 20 as a function of time. The signal may have a pulse-width ratio Th:Tp of 1:4, and one with 1:2 by dashed lines. The rise time Trp and the drop time Tfp of the pulses are selected so that the following conditions are met:

$$Trp<Tp\cdot Rp/2; \text{ and}$$

$$Tfp<Tp\cdot Rp/2.$$

Tp is the period time of the pulse-width modulated signal and Rp is the ratio of the shortest high level to the period time Tp.

The pulse-width modulated signal on the line 20 can be evaluated, for example, by measuring the pulse-width ratio or by low-pass filtering the signal. The cut-off frequency of the low pass filter is selected such that the filter provides a DC value indicative of the high-to-low ratio.

The pulse-width modulated signals can, for example, be transmitted during time windows provided for the purpose, which are produced for example by turning the supply voltage on and off, by the pulse-width modulated signals themselves, or by a chip enable input provided on the two-wire sensors. The two-wire sensors thus exhibit an enable function. They can therefore be turned on and off.

Figure 4:
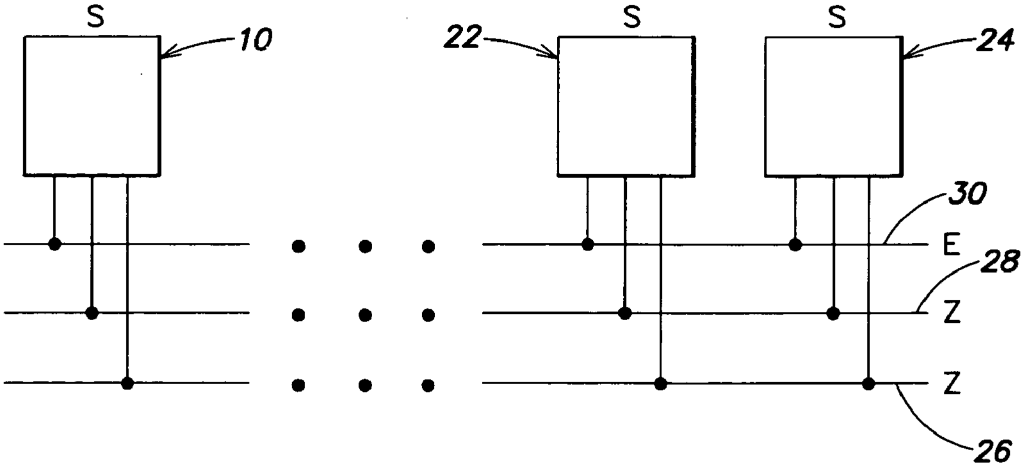
FIG. 4 illustrates a plurality of two-wire sensors each connected to a common two-wire line and operating in time-multiplex mode.

FIG. 4 illustrates a plurality of two-wire sensors 10, 22, 24 each connected to a common two-wire line and operating them in time-multiplex mode. Each of the plurality of two-wire sensors 12, 22, 24 are connected to common two-wire lines 26, 28 and a common enable line 30. Each of the two-wire sensors 10, 22, 24 can also be uniquely identified by various switching thresholds at their chip enable inputs connected to the common enable line 30. As a result, N two-wire sensors can be connected to a common two-wire line and a common enable line, and N two-wire sensors require only three lines instead of N+1 lines. In another embodiment, each of the two-wire sensors 10, 22, 24 are uniquely identified, for example, by a uniquely associated address assigned to them and stored in a memory.

Figure 3:
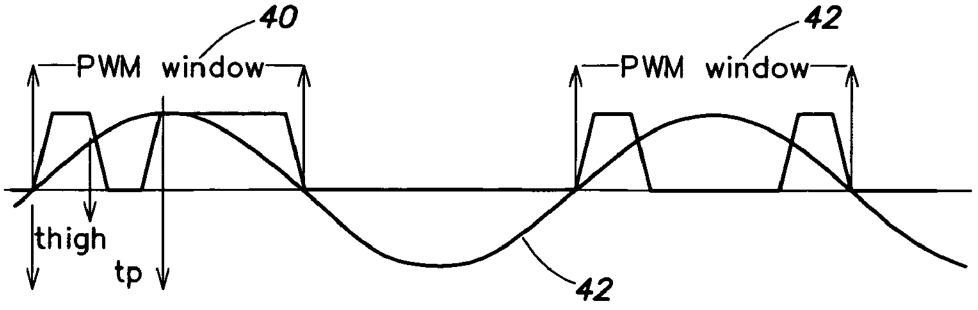
FIG. 3 is a plot of two time windows with the pulse-width modulated signal as well as the analog sensor signal, all as a function of time.

A time window can be defined for example by the zero crossing, the maximum or the minimum of the analog sensor signal. The time window ends on the next zero crossing, maximum or minimum, as applicable, of the analog sensor signal. Preferably at least one edge of the time window reproduces the time variation of the sensor signal. FIG. 3 shows the formation of time windows 40, 42 by the zero crossing of the analog sensor signal plotted along a line 44.

In another embodiment, the two-wire sensors feed current into the chip enable inputs, and the current is evaluated in the two-wire sensors in order to transmit additional information by varying the pulse-width ratio.

The two-wire sensor is especially suitable for use in safety-relevant areas because malfunctions of the two-wire sensor are easily detected.

Although the present invention has been shown and described with respect to several preferred embodiments thereof, various changes, omissions and additions to the form and detail thereof, may be made therein, without departing from the spirit and scope of the invention.

The invention claimed is:

1. A method for measuring a physical parameter using a two-wire sensor, where the two-wire sensor produces a pulse-width modulated output signal having a pulse-pause ratio indicative of the measured physical parameter, where the pulse-pause ratio is nominally asymmetric and when the two-wire sensor senses a fault condition within the sensor the sensor sets the pulse-pause ratio of the pulse-width modulated output signal to be symmetrical.

2. The method of claim 1, where the pulse-width ratio of the pulse-width modulated output signal is set to 1:1 when the sensor senses the fault condition.

3. The method of claim 2, where the pulse-width modulated output signal is evaluated by a low-pass filter.

4. A two-wire sensor for measuring a physical parameter, comprising a sensing element that provides a pulse-width modulated output signal having a pulse-pause ratio that is nominally asymmetrical, and provides the pulse-width modulated output signal with a symmetrical pulse-pause ratio if the sensing element detects a sensor fault.

5. The two-wire sensor of claim 4, where the symmetrical pulse-pause ratio is 1:1.

6. A two-wire sensor comprising:

a first lead;

a second lead; and a magnetic sensor element that senses a physical parameter and provides a pulse width modulated output signal whose pulse width ratio is indicative of the sensed physical parameter, where in the event of a detected fault within the two-wire sensor the magnetic sensor element sets the pulse width ratio of the pulse width modulated output signal to a fault condition pulse width ratio value of 1:1.

7. A sensor comprising:

a first lead;

a second lead; and a sensor element that senses a physical parameter and provides a pulse width modulated output signal whose pulse-pause ratio is indicative of the sensed physical parameter and is nominally asymmetrical, where in the event of a detected fault within the sensor the sensor element sets the pulse-pause ratio of the pulse width modulated output signal to be symmetrical to annunciate the detected fault condition.

8. The sensor of claim 7, where the sensor element comprises a magnetic sensing element.

* * * * *

UNITED STATES PATENT AND TRADEMARK OFFICE

CERTIFICATE OF CORRECTION

PATENT NO. : 7,124,655 B2
APPLICATION NO. : 10/127334
DATED : October 24, 2006
INVENTOR(S) : Lothar Blossfeld It is certified that error appears in the above-identified patent and that said Letters Patent is hereby corrected as shown below:

Column 2 line 41, after "potential" delete "20"

Signed and Sealed this

Twenty-first Day of August, 2007

JON W. DUDAS

*Director of the United States Patent and Trademark Office*